United States Patent
Bazer-Bachi et al.

(10) Patent No.: US 9,480,957 B2
(45) Date of Patent: Nov. 1, 2016

(54) FILTERING DISTRIBUTOR PLATE FOR SUPPLYING A FIXED BED REACTOR HAVING A CO-CURRENT DOWNFLOW OF GAS AND LIQUID FOR THE TREATMENT OF HEAVY CLOGGING FEEDS

(71) Applicant: IFP Energies nouvelles, Rueil-Malmaison (FR)

(72) Inventors: Frederic Bazer-Bachi, Irigny (FR); Yacine Haroun, Grigny (FR); Mathieu Digne, Lyons (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 374 days.

(21) Appl. No.: 14/050,567

(22) Filed: Oct. 10, 2013

(65) Prior Publication Data
US 2014/0097125 A1   Apr. 10, 2014

(30) Foreign Application Priority Data

Oct. 10, 2012 (FR) .................................... 12 02705

(51) Int. Cl.
  *B01J 8/02* (2006.01)
  *B01J 8/04* (2006.01)
  *C10G 49/00* (2006.01)

(52) U.S. Cl.
  CPC .............. *B01J 8/0242* (2013.01); *B01J 8/025* (2013.01); *B01J 8/0278* (2013.01); *B01J 8/0453* (2013.01); *B01J 8/0492* (2013.01); *C10G 49/002* (2013.01); *B01J 2208/025* (2013.01)

(58) Field of Classification Search
  CPC ................ B01J 2208/00212; B01J 422/616; B01J 8/006; B01J 8/0446; B01J 8/0492; B01J 8/0292; B01J 8/0065; B01J 8/34; B01J 2208/00938
  See application file for complete search history.

(56) References Cited

U.S. PATENT DOCUMENTS

| 7,651,076 B2 | 1/2010 | Harter et al. |
| 8,329,974 B2 | 12/2012 | Koudil et al. |
| 8,487,151 B2 | 7/2013 | Koudil et al. |
| 2005/0062178 A1 | 3/2005 | Harter et al. |
| 2009/0177023 A1 | 7/2009 | Koudil et al. |
| 2011/0092754 A1 | 4/2011 | Koudil et al. |
| 2011/0201856 A1* | 8/2011 | Cottard .................... B01J 8/006 585/250 |
| 2013/0064727 A1 | 3/2013 | Koudil et al. |

FOREIGN PATENT DOCUMENTS

| FR | 2 889 973 | 3/2007 |
| FR | 2 924 950 | 6/2009 |
| WO | WO-03 039733 | 5/2003 |

OTHER PUBLICATIONS

Search Report for FR12/02.705 dated Jul. 11, 2013.

* cited by examiner

*Primary Examiner* — Randy Boyer
*Assistant Examiner* — Juan Valencia
(74) *Attorney, Agent, or Firm* — Millen, White, Zelano and Branigan, P.C.

(57) ABSTRACT

The present invention describes a distributor plate adapted to co-current downflow flows of gas and of liquid, more particularly in the "trickle" mode, said distributor plate integrating a filtration function separate from the distribution function.

9 Claims, 1 Drawing Sheet

FILTERING DISTRIBUTOR PLATE FOR SUPPLYING A FIXED BED REACTOR HAVING A CO-CURRENT DOWNFLOW OF GAS AND LIQUID FOR THE TREATMENT OF HEAVY CLOGGING FEEDS

FIELD OF THE INVENTION

The present invention relates to the context of plates for filtering and distributing gas and liquid at the inlet to fixed bed type catalytic reactors operating in trickle flow mode (co-current downflow, liquid speed below 1.5 cm/s). The principal application envisaged is the hydrotreatment of residues, although the present application may be applied to any hydrogenation of oil cuts that could cause clogging of the fixed bed, and even more generally to any liquid phase, with or without gas, charged with clogging particles arriving at a fixed bed.

EXAMINATION OF THE PRIOR ART

The present invention can be viewed as an improvement to several patents filed by the Applicant:

patent FR 2 924 950 describes a filtration plate known as a pre-distribution plate, with an overflow tube for a fixed bed reactor with a co-current downflow of gas and of liquid, that pre-distribution plate consisting of a filtration plate placed above a conventional distributor plate;

patent FR 2 889 973 describes a filtration plate for a fixed bed reactor with a co-current downflow of gas and liquid, that plate providing both the functions of filtration for the catalytic bed placed downstream and of distribution of the gas and liquid fluids. This patent proposes a configuration for the filtration plate in which the chimneys have perforated holes (or slots) in the middle of the catalytic bed, which may cause difficulties in the case of a blockage of the bed in the proximity of the holes. This blockage of the bed would, as a consequence, cause the blockage of the chimney, with two outcomes: an imbalance in the distribution of the liquid flow rate below the distributor plate, and a risk of damage to the chimneys when dismantling the plate if the chimneys are aggregated with and stuck to the catalytic bed;

patent FR 2 959 677 describes an arrangement of removable baskets containing filtration particles and catalyst particles, said baskets being deposited on the distributor plate in order to facilitate fitting/dismantling of said plate and to limit the risk of aggregation between the plate and the catalyst. However, that solution suffers from a certain number of disadvantages: a large number of baskets, meaning that the fitting time is very long, and the need to ensure fluid contact between all of the baskets, while preventing particles from escaping between the baskets.

The present invention provides substantial improvements compared with the prior patents.

BRIEF DESCRIPTION OF THE INVENTION

Figure 1:
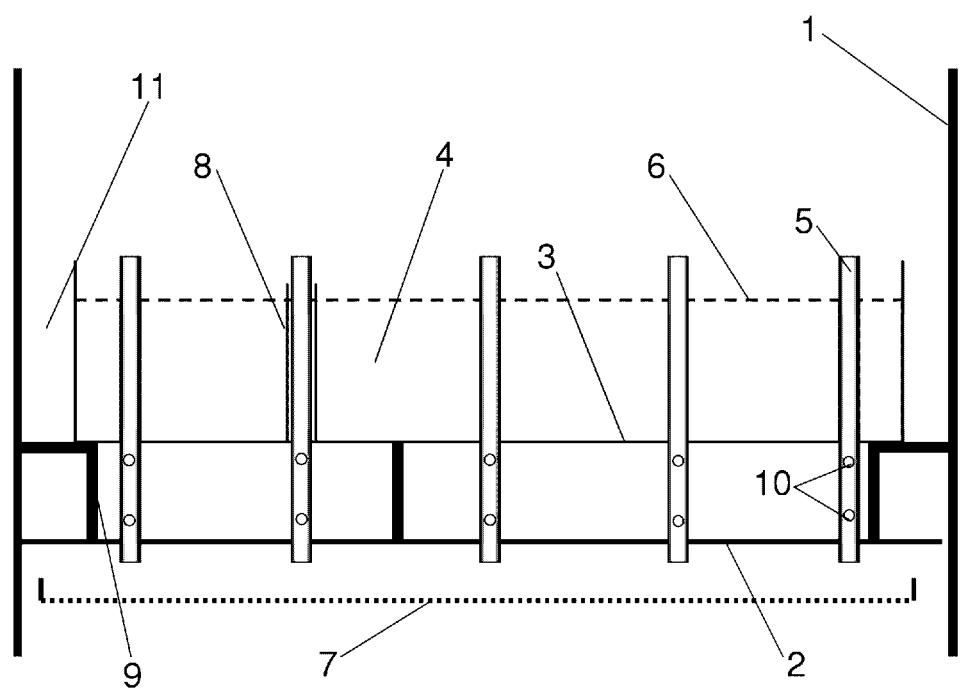
FIG. 1 is a side view of a plate in accordance with the invention, showing the principal elements: filtration layer (4) supported by a perforated support (3), distribution elements (5) supported by the full plate (2), porous lower screen (7).

The present invention can be defined as a distributor plate for supplying a catalytic reactor operating with a gas and liquid feed, more particularly in the flow mode known as trickle mode, i.e. with a liquid surface velocity in the range 0.1 cm/s to 1.5 cm/s.

The present plate can be defined as a distributor plate the function of which is to transform the bi-phase jet entering the reactor into a gas-liquid mixture which is uniformly distributed over the surface of the catalytic bed placed downstream of said plate. The distributor plate of the invention also integrates a filtration function incorporated into the plate per se by means of a filtration layer. In contrast to prior art plates, this filtration layer is separated in some way from the distribution function, as the distribution elements pass through the filtration layer but the gas and liquid inlets inside the distribution elements are located outside said filtration layer.

In general, these distribution elements are in the form of substantially vertical chimneys extending from a lower level located beneath the level of the plate to an upper level located above the upper surface of the filtration layer.

Gas is admitted via the open upper end of the distribution elements, said upper end being located above the filtration layer, and liquid is admitted via a row of orifices, this row being located in the portion located below the filtration layer (4) and above the plate (2) per se.

This portion is only occupied by the liquid since under normal operation, the liquid level above the plate (2) is located inside the filtration layer (4) and below the upper end of the distribution elements (5) which can only be accessed by the gas.

The distribution and filtration plate of the present invention is thus adapted to a gas-liquid flow in co-current downflow mode in a fixed bed reactor which may comprise a plurality of beds of catalyst staged along the reactor.

In general, the filtration plate of the invention is positioned upstream of the first catalytic bed (in the direction of flow of the fluids). When the feed is introduced at different levels onto various catalytic beds staggered along the reactor, it is possible to position a filtration plate of the invention upstream of each of the catalytic beds.

The present invention could be defined as fixed bed reactor with a co-current downflow gas-liquid flow having a distribution and filtration plate suitable for said gaz-liquid flow, said fixed bed reactor which may comprising a plurality of beds of catalyst staged along the reactor, each plate being positioned upstream of each catalytic bed, said plate being constituted by the following elements from top to bottom:

a perforated support (3) not covering the whole section of the reactor, but leaving free an annular zone (11) corresponding to 5% to 50%, preferably 5% to 30% of the section of said reactor, a filtration layer (4) supported by said perforated support (3), a full plate (2) located at a distance in the range 50 mm to 150 mm with respect to the perforated support (3), comprising a plurality of substantially vertical distribution elements (5) crossing the filtration layer (4) and the full plate (2), these distribution elements being disposed in a rectangular or triangular pattern, said distribution elements (5) having a height in the range 200 mm to 400 mm, being open at their upper end to admit gas and comprising at least one row of holes located in the portion of said distribution elements which is comprised between the perforated support (3) and the full plate (2), in order to admit the liquid, and the gas-liquid mixture being evacuated by the lower end of said distribution element (5), at least one high porosity dispersive element (7) located below the full plate (2) at a distance in the range 20 mm to 300 mm, preferably in the range 50 mm to 150 mm with respect to said full plate (2).

The term "full plate (2)" means that this plate has no orifices; gas and liquid leave via the lower ends of the distribution elements (5).

In a variation, the dispersive elements (7) which are intended to disperse the liquid jet below each distribution element (5) are of the deflector type.

They may also be constituted by porous screen elements disposed in a staggered manner below the full plate (2) at distances which extend between a distance in the range 20 mm to 300 mm, preferably in the range 50 mm to 150 mm with respect thereto.

Preferably, in the distribution and filtration plate of the present invention, the distribution elements (5) are constituted by substantially vertical chimneys with a total height in the range 200 mm to 400 mm.

Preferably, in the distribution and filtration plate of the present invention, the filtration medium (4) deposited on the perforated support (3) is constituted by at least one layer of particles known as protective particles, with a height in the range 100 mm to 300 mm, preferably less than 150 mm.

The particles constituting the filtration medium (4) may be:
either particles of guard material or any other particles which generally act as protective elements;
or particles of the catalyst itself.

The present plate is not limited by the choice of guard materials constituting the filtration layer. Any material that is capable of retaining the clogging particles contained in the feed may be suitable for the plate of the present invention.

For heights of the filtration medium in the range 200 mm to 300 mm, it is possible to use a plurality of layers, the first being constituted by particles of guard material, and the next by particles of catalyst. In the majority of cases, a single layer is sufficient. Preferably, in the distribution and filtration plate of the present invention, the high porosity dispersive elements (7) located below the full plate (2) are constituted by pieces of screen disposed in a staggered manner and alternate between a distance of 150 mm and a distance of 250 mm below said plate (2).

Preferably, in the distribution and filtration plate of the present invention, a protective screen or perforated plate (6) intended to break the liquid jet entering the reactor above the filtration layer (4) is disposed above said filtration layer at a distance with respect to said layer of less than 10 mm.

In a variation, the screen (7) can be replaced by any deflector type element which is designed to disperse the liquid jet below each distribution element (5), each deflector being placed beneath each of the distribution elements (5) or beneath just a portion thereof.

In general, the distribution plate of the present invention may be used in any process employing a co-current downflow flow of gas and liquid in the "trickle" mode, i.e. with a surface velocity of liquid in the range 0.1 to 1.5 cm/s.

More particularly, the distribution plate of the present invention is applicable to processes for the hydrotreatment, selective hydrogenation, residue conversion or oxidation of oil cuts containing 3 to 50 carbon atoms, preferably 5 to 30.

The heavy feeds which are capable of being treated using the present distributor filtration plate may be defined as those with a boiling point of more than 370° C., in particular of the residue type or the like: atmospheric residues, vacuum residues, deasphalted oils or indeed residues obtained from conversion processes such as, for example coking, fixed bed, ebullated bed or moving bed hydrotreatment, wherein all types of residue which can be used alone or as a mixture.

These heavy feeds may be used as they are or diluted with a hydrocarbon fraction or a mixture of hydrocarbon fractions.

The heavy feeds with which the present invention is concerned may also include cuts obtained from the coal liquefaction process, from aromatic extracts, or any other hydrocarbon cuts.

DETAILED DESCRIPTION OF THE INVENTION

The distributor plate of the present invention is a distributor plate in the sense that it transforms the two-phase jet (gas-liquid) entering the reactor into a gas-liquid mixture which is homogeneous and uniformly distributed over the surface of the catalytic bed located downstream. In addition, it integrates a filtration function, but differs from prior art filtration plates in that the filtration function is disconnected from the distribution function.

The perforated support (3) on which the filtration layer (4) is deposited is located in a central zone of the plate but does not occupy the whole of the section of the reactor. In fact, there is an annular space (11) between the filtration zone (4) and the walls of the reactor (1).

This annular space (11) allows liquid to pass towards the distribution elements (5) in the situation in which the filtration layer (4) is blocked by the various impurities recovered over time.

The width of this annular space is set so that the pressure balance is complied with, even in the event that the plate is completely clogged.

In this case, the filtration function no longer functions, the distributor plate continues to function because the holes (10) letting liquid into the distribution elements (5) are located in a zone which is entirely separate from the filtration layer (4).

This zone separate from the filtration layer is less than 300 mm high, preferably less than 200 mm high, and in order for the distribution to function correctly, the height of the distribution elements (5) must be greater than 200 mm, preferably greater than 300 mm because this height means that variations in the liquid flow rate which often are demanded by the process can be accommodated.

The filtration zone (4) makes use of a perforated support (3) connected to the distributor plate (2) and held mechanically at this plate (2) by any means known to the skilled person, such as a bent support (9), as shown in FIG. 1, and/or a vertical support (as also shown in the centre of FIG. 1), or any other means which is known to the skilled person.

The plate (2) and the perforated support (3) may be held together by a system of screws or by any other means known to the skilled person.

The perforated support (3) may be perforated in its lower zone, but also in its lateral zone to allow the passage of liquid.

The distribution elements (5) generally have the form of substantially vertical chimneys extending from a lower level located below the plane of the plate (2) to an upper level located above the upper surface of the filtration layer (4).

These distribution elements (5) can be protected by non-perforated sleeves (8).

For this reason, the filtration bed (4) has no contact with the distribution elements (5).

If the filtration bed solidifies, it becomes attached to the sleeves but not to the distribution elements (5) per se. Thus, the lower plate (2) is not deteriorated and separation of the clogged filtration zone (4) from the remainder of the plate is rendered much easier.

For fitting/dismantling, the perforated support (3) is brought in as distributor plate panels, the dimensions of these panels being such that they can be introduced via the manhole of the reactor. In the same manner, the distributor plate (2) is cut up into elements which can be introduced via the manhole.

The sleeves (8) may be placed directly on the perforated support (3) around the distribution elements (5) of the distributor plate.

The filtration medium (4) is deposited directly by "loose" charging onto on the perforated support (3).

Optionally, a protective screen (6) may be added above the filtration medium (4) to protect said medium from the gas/liquid flow entering the reactor, in order to prevent particles constituting said filtration layer from being ejected.

The advantages of the distributor plate of the present invention over prior art plates can be summarized as follows:
- the liquid admission holes of the distribution elements (5) are located below the perforated support (3) and this arrangement means that the filtration function can be disconnected from the distribution function. This distribution also provides a certain flexibility as regards the liquid flow rate, since the liquid level can be established over a fairly wide range of heights from a lower level located in the filtration zone (4) to an upper level located above the filtration layer (4), but which must, however, remain below the upper end of the distribution elements (5) in order to prevent the liquid from coming in via said upper ends which serve to allow gas to pass through;
- the filtration height remains sufficient to carry out the desired function of filtration;
- fitting and dismantling are facilitated compared with the prior art solution of filter baskets:
    - perforated support (3) introduced as panels via the manhole;
    - perforated support (3) supported by a plurality of reinforcements/legs near the wall and/or the distributor plate;
    - protective sleeves (8) to be slotted around the distribution elements (5), manufactured independently outside and deposited directly on the full support (2);
    - full support (2) provided with distribution elements (5) introduced in panels via the manhole.

The distributor plate of the present invention can be used to equip new units or can replace conventional plates on existing units.

For certain types of plates (in the case, for example, of EquiFlow® marketed by Axens), remodelling of said plates is sufficient to be able to install the filtration plate described in the present invention.

Examples in Accordance with the Invention

The present example is given purely by way of illustration and concerns a residue hydrotreatment.

The gas and liquid velocities are in the range [2-5] cm/s for the gas and [0.1-0.5] cm/s for the liquid.

The reactor diameter is 3.5 m.

The dimensions of the distribution elements which were in the form of vertical chimneys (5) are as follows:
- chimney height: 350 mm;
- chimney diameter: 50 mm;
- pitch between chimneys: 200 mm The chimneys comprise two rows of orifices (10) to admit liquid:
- row 1 of orifices: height with respect to full plate 40 mm, 3 holes of 5 mm;
- row 2 of orifices: height with respect to full plate 130 mm, 3 holes of 5 mm;
- opening for passage of gas at head of chimney to admit gas: 30 mm.

The dimensions of the filtration layer (4) are as follows:
- position of perforated support (3): 140 mm above the full plate (2);
- diameter of filtration layer (4): 3.1 m;
- thickness of annular zone (11): 200 mm;
- total height of perforated support (3): 160 mm, i.e. 310 mm above full plate (2), and 10 mm below gas opening of distribution elements (5);
- position of protective plaque (6): 290 mm above full plate (2);
- thickness of layer of guard material: 150 mm.

The entire disclosures of all applications, patents, and publications, cited herein and of corresponding application number FR 12/02.705, filed Oct. 10, 2012 are incorporated by reference herein.

The invention claimed is:

1. A fixed bed reactor with a co-current downflow gas-liquid flow comprising a distribution and filtration plate suitable for said gas-liquid flow, said fixed bed reactor optionally comprising a plurality of beds of catalyst staged along the reactor, each plate being positioned upstream of each catalytic bed, said plate comprising the following elements from top to bottom:
    a perforated support (3) not covering the whole section of the reactor, but leaving free an annular zone (11) corresponding to 5% to 50% of the section of said reactor,
    a filtration layer (4) supported by said perforated support (3),
    a full plate (2) located at a distance of 50 mm to 150 mm with respect to the perforated support (3), comprising a plurality of substantially vertical distribution elements (5) crossing the filtration layer (4) and the full plate (2), these distribution elements being disposed in a rectangular or triangular pattern, said distribution elements (5) having a height of 200 mm to 400 mm, being open at their upper end to admit gas and comprising at least one row of holes located in the portion of said distribution elements which is comprised between the perforated support (3) and the full plate (2), in order to admit the liquid, and the gas-liquid mixture being evacuated by the lower end of said distribution element (5),
    at least one high porosity dispersive element (7) located below the full plate (2) at a distance of 20 mm to 300 mm with respect to said full plate (2).

2. The fixed bed reactor with a co-current downflow gas-liquid flow according to claim 1, in which each distribution and filtration plate has distribution elements (5) that are substantially vertical chimneys surrounded by full sleeves (8) over the portion of the height which corresponds to the depth of the filtration layer (4).

3. The fixed bed reactor with a co-current downflow gas-liquid flow according to claim 2 in which the pitch of the chimneys is 100 to 300 mm.

4. The fixed bed reactor with a co-current downflow gas-liquid flow according to claim 1, in which the filtration layer (4) of the perforated support (3) is at least one layer of guard material particles with a height of 100 mm to 300 mm.

5. The fixed bed reactor with a co-current downflow gas-liquid flow according to claim 1, in which the high porosity dispersive elements (7) located below the full plate (2) are disposed in a staggered manner and alternate between a distance of 150 mm and a distance of 250 mm below said full plate (2).

6. The fixed bed reactor with a co-current downflow gas-liquid flow according to claim 1, in which a protective screen (6) for breaking the liquid jet entering the reactor is disposed above the filtration layer (4).

7. The fixed bed reactor with a co-current downflow gas-liquid flow according to claim 1, in which the dispersive element (7) comprising an assembly of conical deflectors, each deflector being placed below a distribution element (5).

8. The fixed bed reactor with a co-current downflow gas-liquid flow according to claim 1 wherein annular zone (11) corresponds to 5% to 30% of the section of said reactor.

9. The fixed bed reactor with a co-current downflow gas-liquid flow according to claim 1, wherein element (7) is located below the full plate (2) at a distance of 50 mm to 150 mm.

\* \* \* \* \*